US 6,717,418 B2

(12) United States Patent
Orenstein (10) Patent No.: US 6,717,418 B2
(45) Date of Patent: Apr. 6, 2004

(54) METHOD AND APPARATUS FOR MEASURING TURBINE BLADE TIP CLEARANCE

(75) Inventor: Robert M. Orenstein, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 09/987,913

(22) Filed: Nov. 16, 2001

(65) Prior Publication Data
US 2003/0094956 A1 May 22, 2003

(51) Int. Cl.7 .............................................. G01R 27/04
(52) U.S. Cl. ...................................................... 324/644
(58) Field of Search ................................. 324/644, 635, 324/699, 118, 127, 642, 637; 73/618, 632, 660, 1.79; 310/334

(56) References Cited

U.S. PATENT DOCUMENTS

| 4,063,167 A | 12/1977 | Duly |
| 4,329,644 A | 5/1982 | Libertini et al. |
| 4,804,905 A | 2/1989 | Ding et al. |
| 4,806,848 A | 2/1989 | Demers |
| 4,813,273 A | 3/1989 | Parsons |
| 4,818,948 A | 4/1989 | Dooley |
| 4,918,376 A | 4/1990 | Poduje et al. |
| 5,101,165 A | 3/1992 | Rickards |
| 5,140,494 A | 8/1992 | Slade |
| 5,275,052 A | * 1/1994 | Luttrell et al. ................. 73/625 |
| 5,497,101 A | 3/1996 | Fillion |
| 5,513,539 A | 5/1996 | McLaughlin et al. |
| 5,723,980 A | 3/1998 | Haase et al. |
| 5,892,365 A | 4/1999 | Bailleul et al. |
| 5,973,502 A | 10/1999 | Bailleul et al. |
| 6,054,866 A | 4/2000 | Mansfield |

FOREIGN PATENT DOCUMENTS

JP  08-210108 A2  8/1996

OTHER PUBLICATIONS

"Engine Vibration Monitoring Using a Radio Frequency (RF) Vibrometer," Geisheimer, Georgia Institute of Technology, Jul., 2001.

* cited by examiner

Primary Examiner—N. Le
Assistant Examiner—Amy He
(74) Attorney, Agent, or Firm—Nixon & Vanderhye (57) ABSTRACT

An apparatus for measuring blade tip clearance in a gas turbine. The apparatus includes an ultrasonic sensor for measuring a distance between a stator shroud surface and a position of the ultrasonic sensor and providing a first signal indicative thereof; a radio frequency sensor for measuring a distance between rotating blade tips of the gas turbine and a position of the radio frequency sensor and providing a second signal indicative thereof; and a processor for receiving and processing the first and second signals to determine blade tip clearance of the gas turbine. The apparatus may also be used to measure blade tip clearances in a steam turbine, or a compressor.

40 Claims, 5 Drawing Sheets

METHOD AND APPARATUS FOR MEASURING TURBINE BLADE TIP CLEARANCE

This invention relates to gas turbines, and more particularly to a hybrid sensor for measuring turbine blade tip clearance using radio frequency and ultrasonic transducers.

BACKGROUND OF THE INVENTION

Increased efficiency in gas turbines is desirable. Measuring the clearance between moving rotor blades and stationary shrouds in compressor and turbine sections of gas turbines is desired as the efficiency of a gas turbine engine is dependent upon, inter-alia, the clearance between tips of its blades and turbine casing. Thus, the smaller the clearances the lower is the gas leakage across the airfoil tips. However, under certain engine conditions, airfoils and their associated discs may experience thermal growth, thus increasing the risk of contact with the casing.

Accurate measurement of clearance between the tips of rotating blades and their associated casing is essential for gas turbine engine development. Prior approaches and systems for providing such measurement include a probe mounted on a casing surrounding the blades. The blade tip and the probe act as two plates of a capacitor, with the probe relying on a capacitance change within the clearance between the blade and casing/probe to measure blade tip clearance.

More specifically, the capacitive probe forms a part of an electric circuit, to which a high frequency electric signal is provided by means of an oscillator. The high frequency electric signal is amplitude modulated by changes in electrical capacitance as the blade tips pass near the probe. The gap between the probe and the blade tips is calculated, based upon the changes in signal amplitude, to determine blade tip clearance. Unfortunately, the capacitive measurements are adversely influenced by the presence of nearby electric or magnetic fields as well as the changes in the water content of gases passing between the blade tips and the probe. A further drawback of this approach is that the probe must be located close to the turbine hot section, thus limiting the life of the probe.

In another approach, the voltage of an electric spark is used to measure the distance between an electrode (probe) and the blade tips. Here, the measurements are adversely affected by changes in the pressure and/or water content of the gases passing between the blade tips and the probe. The electric spark may also cause damage to the passing blade tips.

In yet another approach, observed changes in magnetic field strength, as the blade tips pass near a magnetic probe, are proportional to the gap between the probe and the blade tips. This method is typically not used in gas turbines due to poor frequency response when compared to capacitive techniques. This approach is also subject to limitations listed for other approaches as identified above.

Optical techniques have also been developed for measuring turbine blade tip clearance. Although optical techniques have the advantage that they can be used in the presence of changing electrical or magnetic fields while achieving a faster response time, these optical techniques are susceptible to dirt or oil deposits on the optical system, thus deteriorating the image quality.

Thus, there is a need to overcome the problems identified with prior approaches in order to measure the blade tip clearance (i.e., the distance between a blade tip and the stator shroud surface).

BRIEF SUMMARY OF THE INVENTION

Accordingly, the present invention relates to a method and apparatus for determining the distance between rotating blade tips and a stator shroud surface by utilizing two different sources of energy and associated signal-processing circuitry.

Radio frequency (RF) energy and RADAR signal processing technology are used for measuring the distance from a fixed transducer to a moving metallic blade. This technique thus offers an advantage of locating a sensor transducer and associated electronics far from the turbine hot section, thereby increasing sensor life. A ceramic or other non-conducting material would be used as a waveguide to direct the RF energy to and from the transducer. The RF energy is reflected from the passing blades, and the distance between the blade tip and the RF transducer can thus be calculated. However, using the above approach, the distance between the blade tip and the stator shroud surface is not measured.

Specifically, the clearance between moving rotor blades and stationary shrouds in the compressor and turbine sections of a gas turbine is achieved by using a hybrid sensor apparatus. RF energy is used to measure the distance between the blade tip and the RF transducer as described above, and ultrasonic energy is used to measure the distance between the stator shroud and the ultrasonic (UT) transducer. The RF transducer and UT transducer are preferably located at equal radial distances from the turbine centerline. The distance between the stator shroud surface and the UT transducer is subtracted from the distance between the blade tip and the RF transducer to determine the blade tip clearance. The subtraction is preferably performed using electronic circuitry.

In its broader aspects, the present invention provides a method for determining blade tip clearance in a gas turbine, the method comprising (a) measuring a distance between an ultrasonic sensor and a stator shroud surface; (b) measuring a distance between a radio frequency sensor and rotating blade tips of the gas turbine; and (c) using the distance measured in step (a) and the distance measured in step (b) to determine the blade tip clearance in the gas turbine. Step (a) further comprises using an ultrasonic transducer to direct ultrasonic energy towards the stator shroud surface and to receive reflected ultrasonic energy; and providing a measurement in real-time to a processor. Step (b) further comprises using a radio frequency transducer to direct radio frequency energy towards the rotating blade tips of the gas turbine and to receive reflected radio frequency energy; and providing a measurement in real-time to a processor.

An ultrasonic waveguide is preferably used to direct ultrasonic energy between the ultrasonic transducer and the stator shroud surface. A radio frequency waveguide is preferably used to direct radio frequency energy between the radio frequency transducer and the rotating blade tips of the gas turbine. The radio frequency waveguide is preferably made from ceramic materials. Both the ultrasonic sensor and the radio frequency sensor are preferably disposed at equal radial distances from a reference point on the gas turbine, the reference point being centerline of a rotor.

In another aspect, the present invention provides an apparatus for determining blade tip clearance of a gas turbine, the apparatus comprising: an ultrasonic sensor for measuring a distance between a stator shroud surface and a position of the ultrasonic sensor and providing a first signal indicative thereof; a radio frequency sensor for measuring a distance between rotating blade tips of the gas turbine and a position of the radio frequency sensor and providing a second signal indicative thereof; and a processor for receiving and processing said first and second signals to determine blade tip clearance of the gas turbine. The apparatus further includes an ultrasonic waveguide for directing ultrasonic energy between the ultrasonic sensor and the stator shroud surface, and wherein a first end of the ultrasonic waveguide is fixed to the ultrasonic sensor, and an opposite second end is made an integral part of the shroud surface. The apparatus further includes a radio frequency waveguide for directing radio frequency between the radio frequency sensor and the rotating blade tips of the gas turbine.

In another aspect, a method for determining a distance between a tip of a rotating blade and a stator shroud surface of a gas turbine, the method comprising: (a) measuring a distance between an ultrasonic transducer and the stator shroud surface; (b) measuring a distance between a radio frequency transducer and the tip of the rotating blade of the gas turbine; and (c) using the distance measured in step (a) and the distance measured in step (b) to determine the distance between the tip of the blade and the stator shroud surface.

In a further aspect, the present invention provides a gas turbine having a stator having a stator shroud surface; a plurality of rotating blades with respective blade tips; a first means for measuring the distance between the stator shroud surface and the first means; a second means for measuring the distance between the rotating blade tips and the second means; and means for receiving and using measurements made by the first means and the second means to determine blade tip clearance of the gas turbine. The apparatus further comprises a means for directing ultrasonic energy between the first means and the stator shroud surface, a means for directing radio frequency between the second means and the rotating blade tips of the gas turbine. Preferably, both the first and second means are disposed at equal radial distances from a reference point on the gas turbine, the reference point being centerline of gas turbine rotor.

In a further aspect, a hybrid sensor for determining the clearance between rotor blade tips and a stator shroud of a gas turbine, the hybrid sensor comprising: an ultrasonic sensor for measuring a distance between a stator shroud surface and the ultrasonic sensor; a radio frequency sensor for measuring a distance between rotating blade tips and the radio frequency sensor; and a processor for receiving and using the ultrasonic sensor measurements and the radio frequency sensor measurements to determine blade tip clearance of the gas turbine.

In yet another aspect, a method of operating a gas turbine, the method comprising the steps of: a) using an ultrasonic transducer to generate a first signal indicative of a distance between a stator shroud surface and a position of the ultrasonic transducer; b) using a radio frequency (RF) transducer to generate a second signal indicative of a distance between rotating blade tips and a position of the RF transducer, the position of the ultrasonic transducer and the position of the RF transducer being disposed essentially at equal radial distances from a from a reference point on the gas turbine; and c) using the first signal and the second signal to determine a clearance between the blade tips and the stator shroud surface.

In a further aspect, a method of operating a gas turbine, the method comprising the steps of: a) using a first sensor to generate a first signal indicative of a distance between a stator shroud surface and a position of the first sensor; b) using a second sensor to generate a second signal indicative of a distance between rotating blade tips and a position of the second sensor, the position of the first sensor and the position of the second sensor being essentially radially equidistant from a reference point on the gas turbine; and c) using the first signal and the second signal to determine a clearance between the blade tips and the stator shroud surface.

In another embodiment, the method and apparatus of the present invention is used to measure a blade tip clearance in a steam turbine according to various aspects of the present invention.

In yet another embodiment, the method and apparatus of the present invention is used to measure a blade tip clearance in a compressor according to various aspects of the present invention.

In a further aspect, the present invention provides a hybrid sensor for determining the clearance between moving rotor blades and stationary shrouds in compressor and turbine sections of a gas turbine in accordance with various aspects of the present invention.

DETAILED DESCRIPTION OF THE INVENTION

Figure 1:
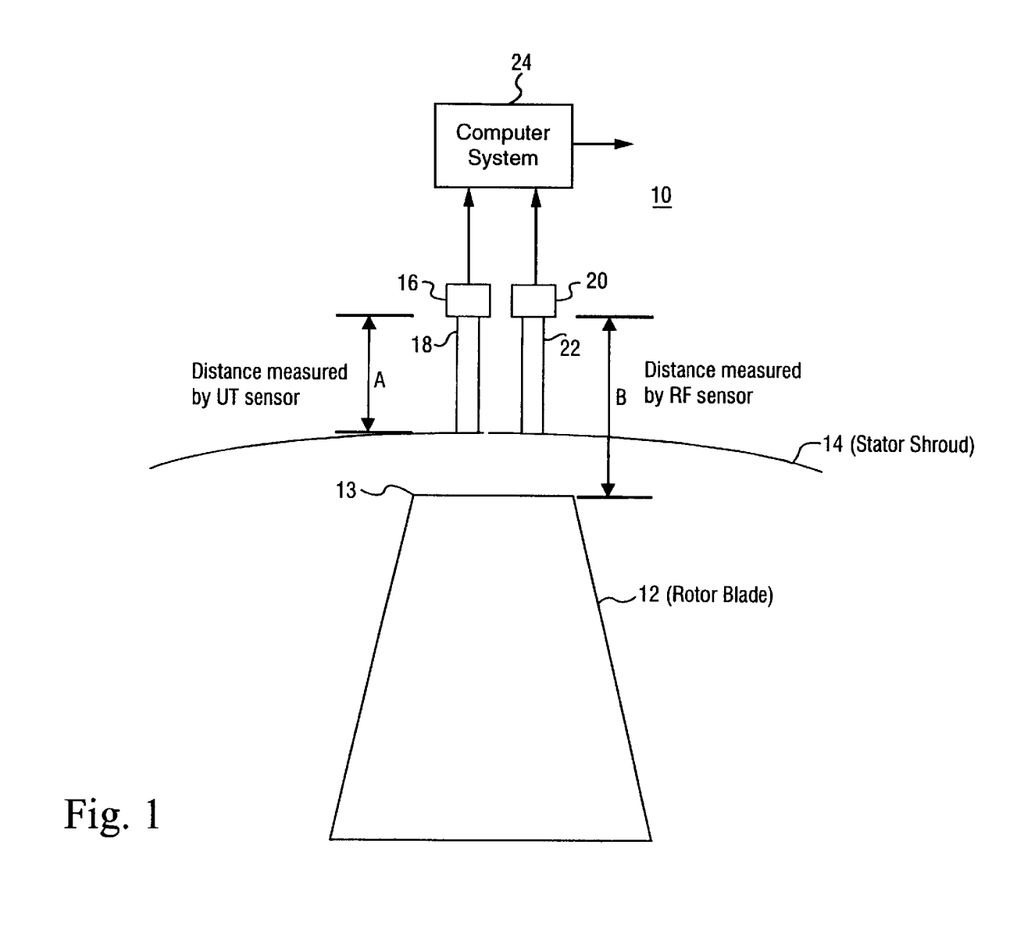
FIG. 1 is a diagrammatic representation of a distance measurement apparatus in accordance with an example embodiment of the present invention.

FIG. 1 is a diagrammatic representation of a distance measurement apparatus 10 in accordance with an example embodiment of the present invention. Apparatus 10 includes an ultrasonic transducer ("UT transducer") 16 located adjacent to a stator shroud surface 14 of a gas turbine. The UT transducer is also alternatively referred to as ultrasonic sensor ("UT sensor"). An ultrasonic waveguide ("UT waveguide") 18 is provided adjacent to the stator shroud surface 14 to direct the ultrasonic energy from the UT transducer 16 towards the stator shroud surface 14, and vice-versa. One end of the UT waveguide 18 is preferably rigidly fixed to the UT transducer 16 while the opposite end is made an integral part of the shroud surface 14. The UT waveguide 18 is made of materials, such as, for example, metal, ceramic, polymer, in order to direct the energy to and from the transducer. The materials used for making the UT waveguide must preferably possess the following properties: (a) the material must not attenuate the ultrasonic energy over the required distance from the UT sensor to the shroud surface; (b) the material must be durable in the compressor or turbine environment (ability to withstand temperature, vibration, etc.)—this requirement would depend upon the specific axial location in a gas turbine, steam turbine, or a compressor where the sensor is used; (c) the material must be softer than the blade tip material, as the waveguide must wear preferentially in the event the blade tip comes into contact with the shroud. The UT transducer 16 is used to determine the distance between the stator shroud surface 14 and the position of the UT transducer 16, the distance being generally identified herein as "A".

Apparatus 10 further includes a radio frequency (RF) transducer 20 disposed adjacent to the stator shroud surface 14. A RF waveguide 22 directs RF energy from the RF transducer 20 towards rotating blades 12 of a gas turbine 11 (FIG. 4), and vice-versa in order to measure the radial distance to the tip of the rotating blades 12. The RF transducer is also alternatively referred to as RF sensor. A single blade 12 is shown in FIG. 1 for the sake of simplicity. It will be understood that the turbine likely comprises a plurality of such blades.

RF waveguide 22 is preferably located such that one end of it is fixed to the RF transducer 20 while the opposite end is integral with the shroud surface 14. A ceramic or other non-conducting material is preferably used for the RF waveguide 22. Since the RF wavelength is relatively long, the RF sensor may be located far from a turbine hot section, thus increasing the sensor life. The RF and UT transducers are preferably located at equal radial distances from a reference point on the gas turbine, the reference point typically being the centerline of rotor of the gas turbine. The RF transducer 20 is used to determine the distance between rotating blade tips of a gas turbine and the position of the RF transducer 20, the distance being generally identified herein as "B".

Figure 2:
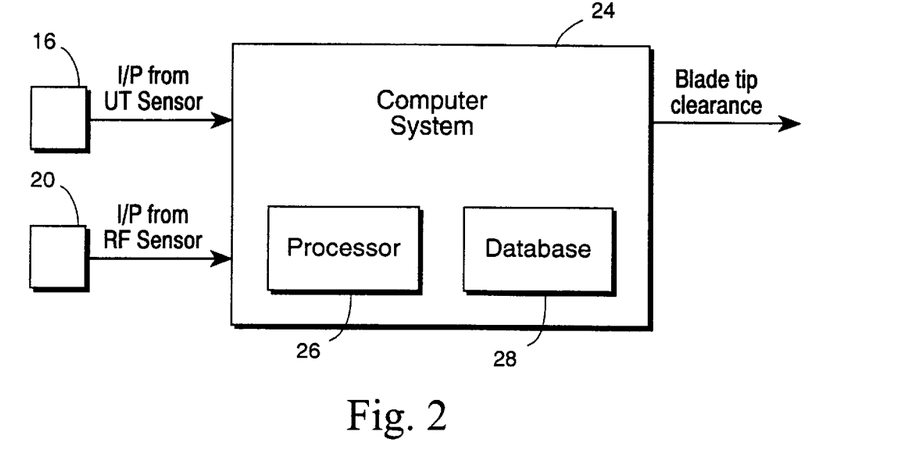
FIG. 2 illustrates a system for determining blade tip clearance from the measurements made using the apparatus of FIG. 1.

A computer system 24 (FIG. 2) having a processor 26 and a database 28. The computer system 24 receives signals from UT transducer 16 and RF transducer 20 to determine a blade tip clearance. Measurements A and B are provided to the computer system 24 and stored in the database 28. The processor 26 may be programmed to subtract the distance (A) (i.e., the distance between the stator shroud surface and the UT transducer 16) from distance (B) (i.e., the distance between the blade tip and the RF transducer), thus providing a measurement of the blade tip clearance in real-time. The output of the computer system 24 provides a value indicative of a blade tip clearance. The computer system 24 may also alert an operator by providing a visual or an audible signal in the event a blade tip comes into contact with the shroud.

Figure 3:
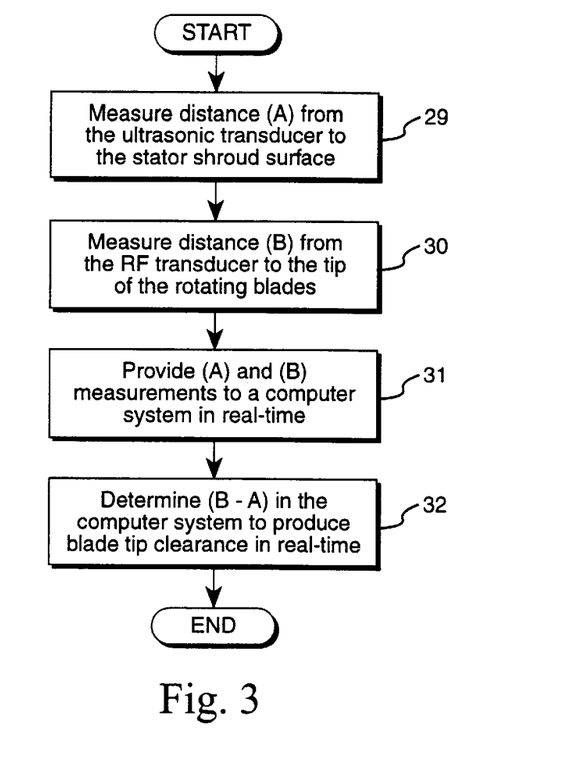
FIG. 3 illustrates a flow chart to determine the blade tip clearance in accordance with the present invention as shown in FIGS. 1–2.

FIG. 3 is a flow-chart illustrating the various steps involved in determining the blade tip clearance in accordance with an example embodiment of the present invention. In operation, ultrasonic energy from UT sensor 16 is directed via UT waveguide 18 towards the stator shroud surface 14 to determine distance (A) between the UT transducer and the surface of the stator shroud as generally indicated at step 29. Likewise, RF energy from the RF transducer 20 is directed via RF waveguide 22 towards rotating blades 12 of a gas turbine to determine distance (B) between the RF transducer and the tip of the rotating blades as indicated at step 30. Signals indicative of the distances (A) and (B) are applied as shown at step 31 to a computer system 24 (FIG. 2) are stored in database 28 and the stored data is made available to processor 26 as shown at step 32 to determine the blade tip clearance, i.e., the difference between the tip of the rotating blade 13 and the surface of the stator shroud 14 (FIG. 1).

Figure 4:
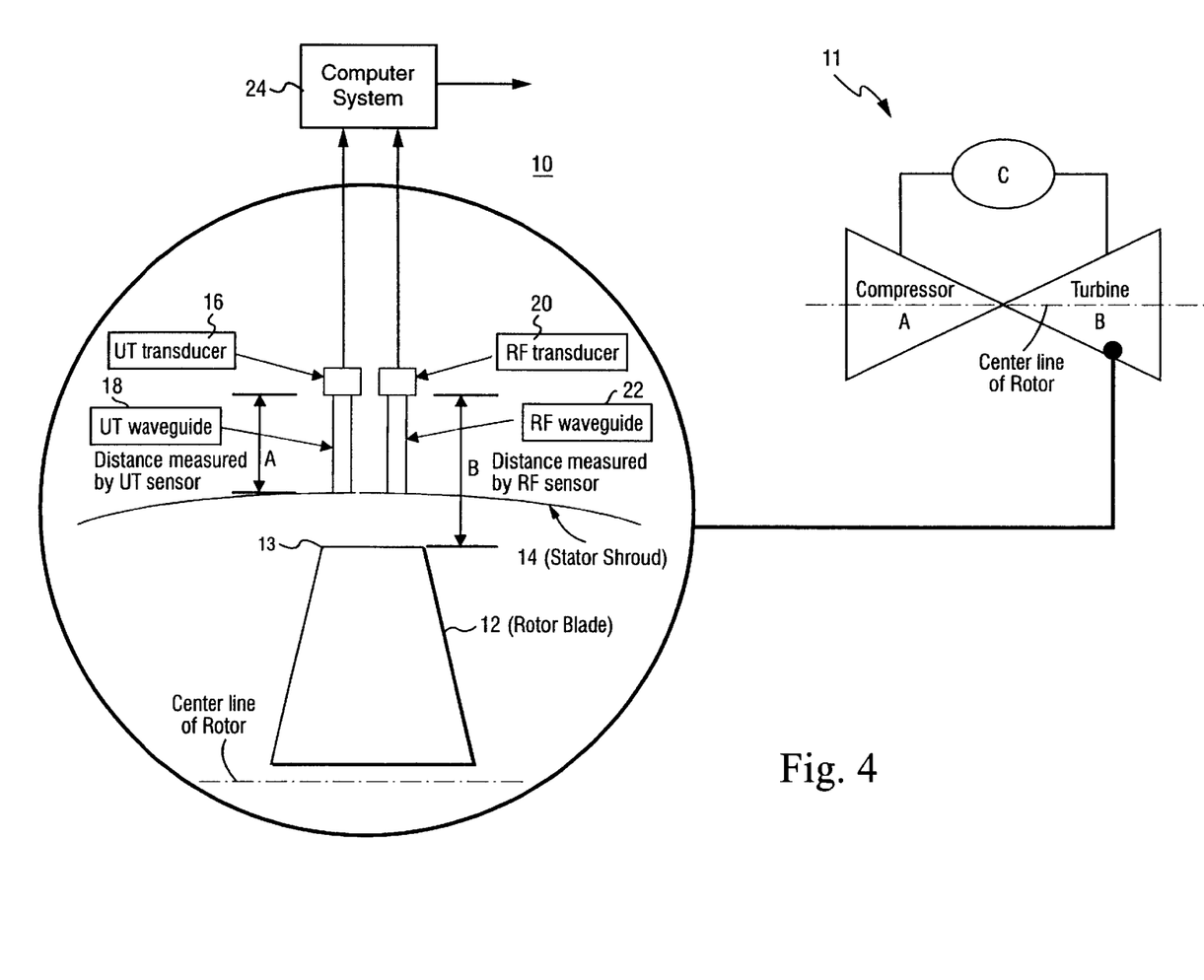
FIG. 4 illustrates a high-level schematic of a gas turbine including the apparatus shown in FIG. 1.

FIG. 4 shows another embodiment of the present invention wherein a high-level schematic of a gas turbine 11 having the blade tip clearance measurement apparatus 10 as shown in FIG. 1.

Figure 5:
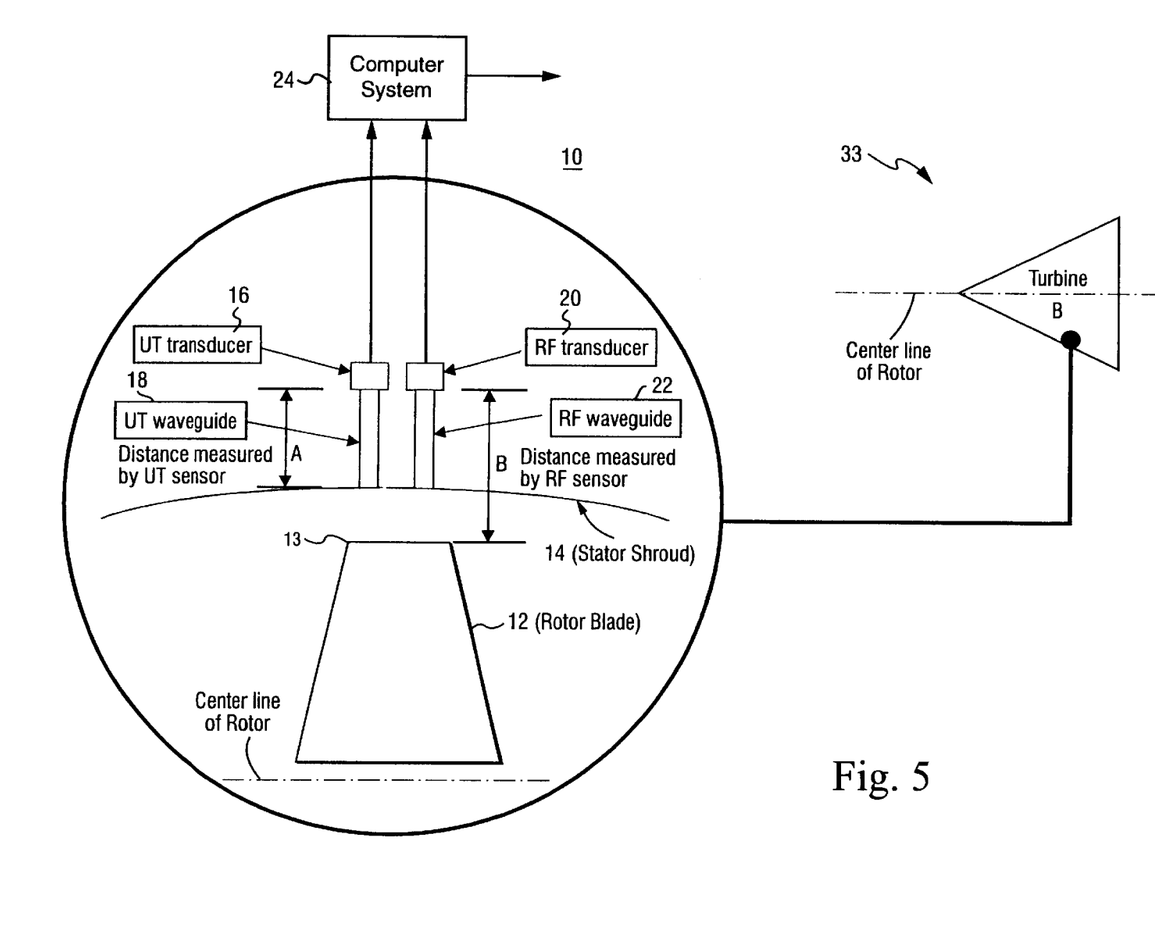
FIG. 5 illustrates an apparatus as shown in FIG. 1 for measuring blade tip clearance in a steam turbine.

FIG. 5 shows another embodiment of the present invention wherein a high-level schematic of a steam turbine 33 having the blade tip clearance measurement apparatus 10 as shown in FIG. 1. FIG. 5 shows a portion of a steam turbine for the sake of simplicity. Here, RF and UT transducers are located at equal radial distances from a reference point on the steam turbine, the reference point typically being the centerline of a rotor of the steam turbine.

Figure 6:
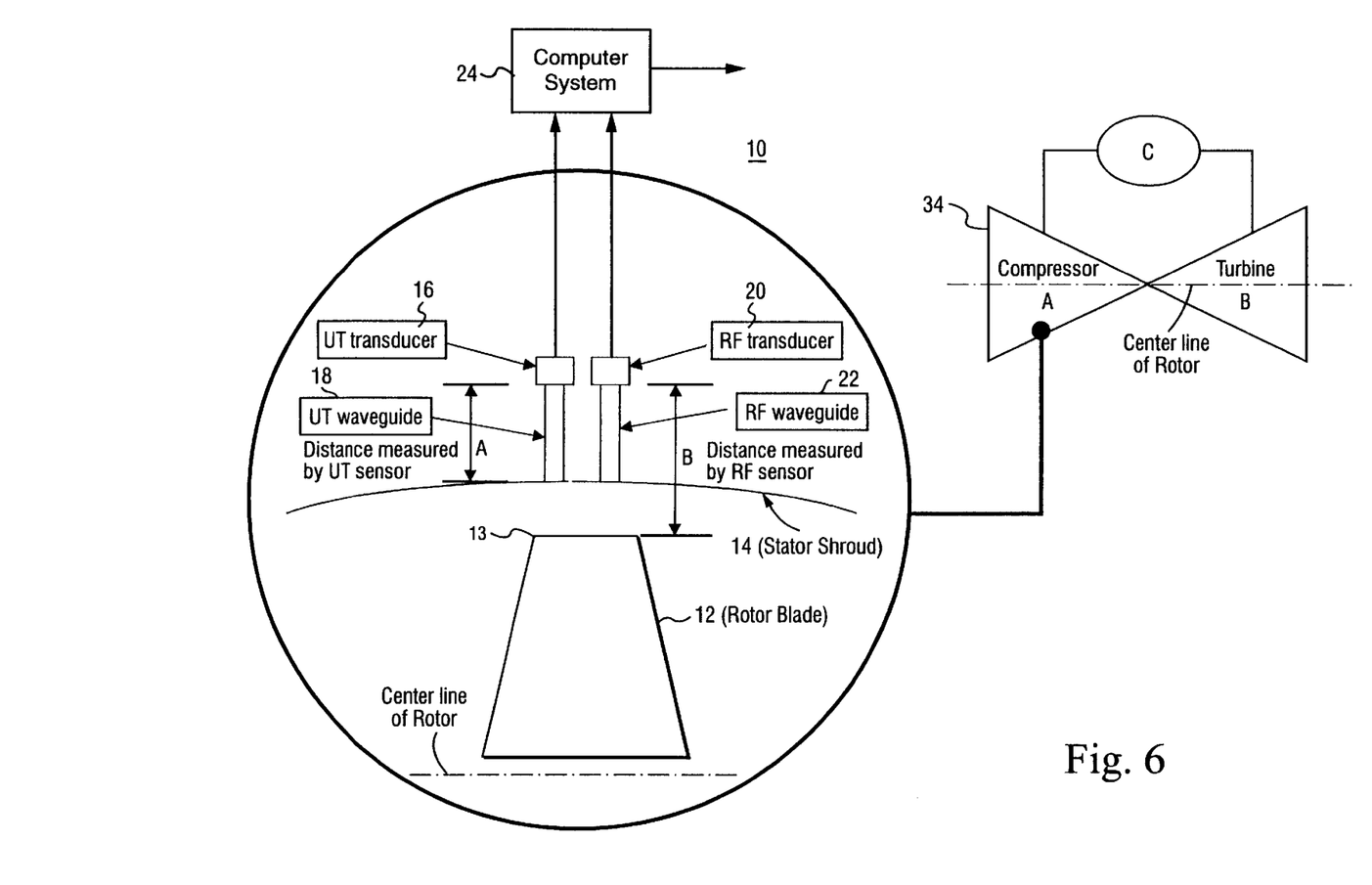
FIG. 6 illustrates an apparatus as shown in FIG. 1 for measuring blade tip clearance in a compressor.

FIG. 6 shows yet another embodiment of the present invention wherein a high-level schematic of a compressor 34 having the blade tip clearance measurement apparatus 10 as shown in FIG. 1. Here, RF and UT transducers are located at equal radial distances from a reference point on the compressor, the reference point typically being the centerline of a rotor of the compressor.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for determining in situ blade tip clearance in a gas turbine, the method comprising:
   (a) measuring a distance between an ultrasonic sensor and a stator shroud surface;
   (b) measuring a distance between a radio frequency sensor and rotating blade tips of the gas turbine; and
   (c) using the distance measured in step (a) and the distance measured in step (b) to determine the blade tip clearance in the gas turbine.

2. The method as in claim 1, wherein step (a) further comprising:
   using an ultrasonic transducer to direct ultrasonic energy towards the stator shroud surface and to receive reflected ultrasonic energy; and
   providing a measurement in real-time to a processor.

3. The method as in claim 2, further comprising:
   using an ultrasonic waveguide to direct ultrasonic energy between the ultrasonic transducer and the stator shroud surface.

4. The method as in claim 1, wherein step (b) further comprises:
   using a radio frequency transducer to direct radio frequency energy towards the rotating blade tips of the gas turbine and to receive reflected radio frequency energy; and
   providing a measurement in real-time to a processor.

5. The method as in claim 3, further comprising:
   using a radio frequency waveguide to direct radio frequency energy between the radio frequency transducer and the rotating blade tips of the gas turbine.

6. The method as in claim 5, wherein the radio frequency waveguide is made from ceramic materials.

7. The method as in claim 1, wherein both the ultrasonic sensor and the radio frequency sensor are disposed essentially at equal radial distances from a reference point on a gas turbine, the reference point being centerline of a rotor.

8. An apparatus for determining in situ blade tip clearance in a gas turbine, the apparatus comprising:
   an ultrasonic sensor in the gas turbine for measuring a distance between a stator shroud surface and a position of the ultrasonic sensor and providing a first signal indicative thereof;
   a radio frequency sensor in the gas turbine for measuring a distance between rotating blade tips of the gas turbine and a position of the radio frequency sensor and providing a second signal indicative thereof; and a processor for receiving and processing said first and second signals to determine blade tip clearance of the gas turbine.

9. The apparatus of claim 8, further comprising:

an ultrasonic waveguide for directing ultrasonic energy between the ultrasonic sensor and the stator shroud surface.

10. The apparatus of claim 9, wherein a first end of said ultrasonic waveguide is fixed to said ultrasonic sensor, and an opposite second end is made an integral part of said shroud surface.

11. The apparatus of claim 8, further comprising:

a radio frequency waveguide for directing radio frequency between said radio frequency sensor and the rotating blade tips of the gas turbine.

12. The apparatus of claim 11, wherein the radio frequency waveguide is made from ceramic materials.

13. The apparatus of claim 8, wherein both the ultrasonic sensor and the radio frequency sensor are disposed at equal radial distances from a gas turbine centerline.

14. A method for determining in situ a distance between a tip of a rotating blade and a stator shroud surface in a gas turbine, the method comprising:

(a) measuring a distance between an ultrasonic transducer and the stator shroud surface;

(b) measuring a distance between a radio frequency transducer and the tip of the rotating blade of the gas turbine; and (c) determining the distance between the tip of the blade and the stator shroud surface using the distance measured in step (a) and the distance measured in step (b).

15. The method as in claim 14, wherein step (a) further comprising:

directing ultrasonic energy towards the stator shroud surface; and providing a measurement in real-time to a processor.

16. The method as in claim 15, further comprising:

using an ultrasonic waveguide to direct ultrasonic energy towards the stator shroud surface.

17. The method as in claim 14, wherein step (b) further comprises:

directing radio frequency energy towards the rotating blade tips of the gas turbine; and providing a measurement in real-time to a processor.

18. The method as in claim 17, further comprising:

using radio frequency waveguide to direct radio frequency energy towards the rotating blade tips of the gas turbine.

19. A gas turbine, comprising:

a stator having a stator shroud surface;

a plurality of rotating blades with respective blade tips;

a first means for measuring in situ the distance between the stator shroud surface and the first means;

a second means for measuring in situ the distance between the rotating blade tips and the second means; and means responsive to said measurements made by said first means and said second means to determine blade tip clearance of the gas turbine.

20. The apparatus as in claim 19, wherein said first means includes means for directing ultrasonic energy between said first means and said stator shroud surface.

21. The apparatus of claim 19, wherein said second means includes means for directing radio frequency between said second means and the rotating blade tips of the gas turbine.

22. The apparatus of claim 19, wherein both said first and second means are disposed at equal radial distances from a reference point on the gas turbine, the reference point being centerline of a rotor.

23. A hybrid sensor for determining in situ the clearance between rotor blade tips and a stator shroud of a gas turbine, the hybrid sensor comprising:

an ultrasonic sensor for measuring a distance between a stator shroud surface and the ultrasonic sensor;

a radio frequency sensor for measuring a distance between rotating blade tips and the radio frequency sensor; and a processor responsive to the ultrasonic sensor measurements and the radio frequency sensor measurements to determine blade tip clearance of the gas turbine.

24. A method of operating a gas turbine, the method comprising the steps of:

(a) causing an ultrasonic transducer to generate a first signal indicative of a distance between a stator shroud surface and a position of the ultrasonic transducer;

(b) using a radio frequency (RF) transducer to generate a second signal indicative of a distance between rotating blade tips within said turbine and a position of the RF transducer, the position of the ultrasonic transducer and the position of the RF transducer being essentially equidistant from a reference point on the gas turbine; and (c) using the first signal and the second signal to determine a clearance between the blade tips and the stator shroud surface.

25. The method as in claim 24, further comprising:

using an ultrasonic waveguide to direct ultrasonic energy towards the stator shroud surface.

26. The method as in claim 24, further comprising:

using a radio frequency waveguide to direct radio frequency energy towards the rotating blade tips of the gas turbine.

27. A method of operating a gas turbine, the method comprising the steps of:

a) using a first sensor within a turbine to generate a first signal indicative of a distance between a stator shroud surface and a position of the first sensor;

b) using a second sensor to generate a second signal indicative of a distance between rotating blade tips within said turbine and a position of the second sensor, the position of the first sensor and the position of the second sensor being essentially equidistant from a reference point on the gas turbine; and c) using the first signal and the second signal to determine a clearance between the blade tips and the stator shroud surface.

28. A method for determining in situ blade tip clearance in a steam turbine, the method comprising:

(a) measuring a distance between an ultrasonic sensor and a stator shroud surface;

(b) measuring a distance between a radio frequency sensor and rotating blade tips of the steam turbine; and (c) using the distance measured in step (a) and the distance measured in step (b) to determine the blade tip clearance in the steam turbine.

29. The method as in claim 28, wherein step (a) further comprising:

using an ultrasonic transducer to direct ultrasonic energy towards the stator shroud surface and to receive reflected ultrasonic energy; and providing a measurement in real-time to a processor.

30. The method as in claim 29, further comprising:
using an ultrasonic waveguide to direct ultrasonic energy between the ultrasonic transducer and the stator shroud surface.

31. The method as in claim 28, wherein step (b) further comprises:
using a radio frequency transducer to direct radio frequency energy towards the rotating blade tips of the steam turbine and to receive reflected radio frequency energy; and
providing a measurement in real-time to a processor.

32. The method as in claim 31, further comprising:
using a radio frequency waveguide to direct radio frequency energy between the radio frequency transducer and the rotating blade tips of the steam turbine.

33. The method as in claim 32, wherein the radio frequency waveguide is made from ceramic materials.

34. The method as in claim 28, wherein both the ultrasonic sensor and the radio frequency sensor are disposed essentially at equal radial distances from a reference point on a steam turbine, the reference point being centerline of a rotor.

35. A method for determining in situ blade tip clearance in a compressor, the method comprising:
(a) measuring a distance between an ultrasonic sensor and a stator shroud surface;
(b) measuring a distance between a radio frequency sensor and rotating blade tips of the compressor; and
(c) determining the blade tip clearance in the compressor using the distance measured in step (a) and the distance measured in step (b).

36. The method as in claim 35, wherein step (a) further comprising:
using an ultrasonic transducer to direct ultrasonic energy towards the stator shroud surface and to receive reflected ultrasonic energy; and
providing a measurement in real-time to a processor.

37. The method as in claim 36, further comprising:
using an ultrasonic waveguide to direct ultrasonic energy between the ultrasonic transducer and the stator shroud surface.

38. The method as in claim 35, wherein step (b) further comprises:
using a radio frequency transducer to direct radio frequency energy towards the rotating blade tips of the compressor and to receive reflected radio frequency energy; and
providing a measurement in real-time to a processor.

39. The method as in claim 38, further comprising:
using a radio frequency waveguide to direct radio frequency energy between the radio frequency transducer and the rotating blade tips of the compressor.

40. The method as in claim 35, wherein both the ultrasonic sensor and the radio frequency sensor are disposed essentially at equal radial distances from a reference point on a compressor, the reference point being centerline of a rotor.

* * * * *